June 3, 1930.    T. E. BURKHARDT    1,762,088
FUSED QUARTZ VALVE
Original Filed May 17, 1926
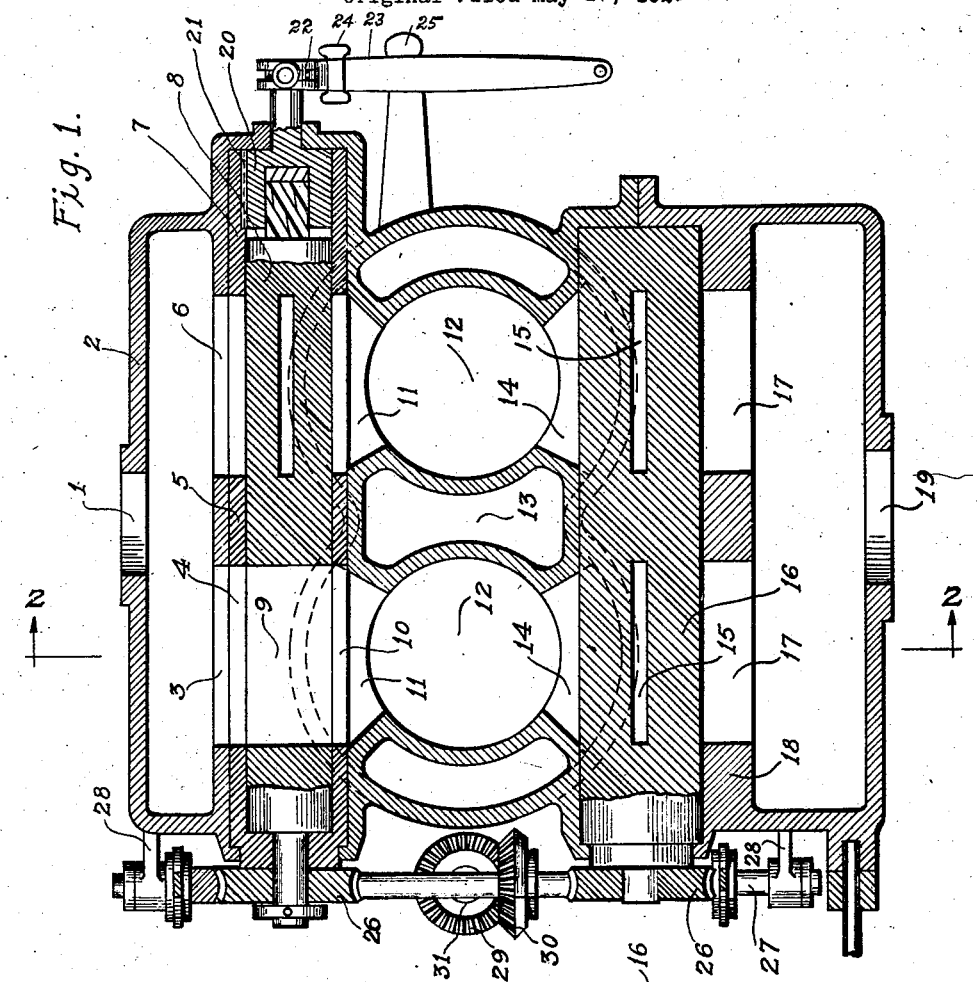
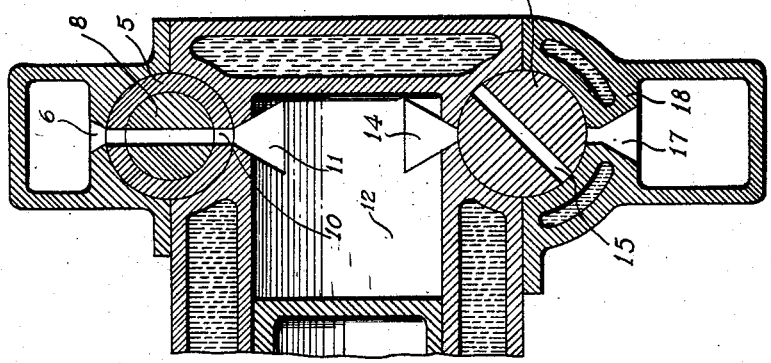
INVENTOR
THOMAS E. BURKHARDT
BY Taulmin & Taulmin,
ATTORNEYS Patented June 3, 1930

1,762,088

UNITED STATES PATENT OFFICE

THOMAS E. BURKHARDT, OF DETROIT, MICHIGAN

FUSED-QUARTZ VALVE

Substitution for application Serial No. 109,571, filed May 17, 1926. This application filed November 30, 1929. Serial No. 410,891.

This application is a substitute for my prior application Serial No. 109,571, filed May 17, 1926.

My invention relates to valves and in particular to the adaptation of fused quartz thereto.

It is the object of my invention to provide a valve which will not be affected by the heat found in an internal combustion engine, which has sufficient strength for the purpose of forming a valve, which usually needs no lubrication as it is not affected by heat to such an appreciable degree as to cause sticking and further because it may be ground to form a fineness of fit desired without leakage.

I have discovered a new use and new property in a non-carbonaceous and non-metallic material, fused quartz, when adapted to valves for internal combustion engines and for liners for rotary valves in internal combustion engines.

Heretofore, valves made of metal have all been subjected to the difficulties arising from the intense heating and alternate cooling. In rotary valves in particular, the utilization of the necessary length of rotary valve has resulted to date in great difficulties in that the problem of lubrication has never been solved nor the problem of preventing the long rotary valve or its sleeve from warping.

By utilizing fused quartz I have found that I can form the quartz in the desired size, can grind it to optical fineness of surface and with optical accuracy and can mold in it the metal parts necessary for its actuation and support or I can so mold it that it will fit into associated metal parts.

Referring to the drawings:

Figure 1 is a transverse section through the top of the valve housings and cylinders of an internal combustion rotary valve engine showing the use of a fused quartz valve as a liner and the use of a fused quartz valve with a fused quartz liner;

Figure 2 is a section on the line 2—2 of Figure 1.

Referring to the drawings in detail, it will be understood that my invention does not rest in any particular type of engine or valve construction but in the adaptation of fused quartz to such uses.

The drawings show a typical installation. 1 indicates an inlet port for incoming gases into the inlet manifold whence the gases pass through the inlet passageway 3 through the aperture 4 in the quartz sleeve 5, such sleeve being the liner for the inlet rotary valve. A second inlet passageway 6 is provided in the manifold which coincides with another inlet passageway in the sleeve in order to register with the passageway 7 shown in the rotary valve 8 of fused quartz. The inlets 3 and 4 register with the passageway 9 in the valve of fused quartz which in turn registers with the passageway 10 in the other wall of the sleeve and with the inlet passageway 11 of the cylinder 12. The cylinders are provided with the usual water jacket spaces 13 for the circulation of cooling fluids. An exit port 14 is provided in the cylinder which is adapted to register with the exhaust port 15 in the fused quartz exhaust valve 16 which is adapted to register with the exhaust port 17 of the exhaust manifold 18. The exit port 19 is provided in the exhaust manifold. Similar ports are provided in connection with the other of the two cylinders.

Turning to the inlet valve sleeve, it will be noted that it is fitted in the metallic casing. It is adjusted in position by being rotated through the medium of the metallic head 20 which is splined thereto by the key 21. This head is actuated by the toggle levers 22 and 23 pivotally supported at 24 and 25. By rotating the sleeve 5 the extent of the opening of the ports on the intake side can be varied and the operation of the engine thereby controlled.

The valves are rotated by the gears 26 mounted on the ends thereof which are in turn actuated by worms which lie beneath the gears mounted on the shaft 27 supported in the brackets 28 and actuated through the gears 29 and 30 by a shaft 31 driven from the crank shaft.

I have found that the modulus of elasticity in compression of fused quartz is 940,000 pounds per square inch. Its compressive strength is probably greater than 191,000 pounds to each square inch. Its modulus of rupture obtained by using an Amsler Laffon torsion machine was .15 m. k. g. (109 feet lb. capacity) reading to .001 m. k. (.07 lb.). These figures are indicative of the strength and other physical characteristics of this material. The tensile strength is 6,950 lbs. per sq. inch. Fused quartz is serviceable up to 1000 degrees centigrade without injury, has a remarkably small coefficient of thermal expansion, is capable of being produced on a commercial scale and will take a polish like optical glass so that a great accuracy of finish may be secured.

It is my purpose to utilize either clear or translucent fused quartz, as it is inert and is not subjected to the usual chemical reactions, such as pitting, to which metallic valves are subject. Fused quartz has such a low coefficient of thermal expansion that a rod of quartz one meter in length will expand only about six-tenths of a millimeter for a thousand degree centigrade rise in temperature. Thus, I find that there is small probability of fracture under sudden changes of temperature such as found in internal combustion engines.

It will be understood that I desire to comprehend within my invention such modifications and adaptations as may be necessary. I desire to comprehend within the invention the utilization of this material to valves of all kinds, not only rotary valves but piston valves and slide valves, and sleeve valves.

Having thus fully described my invention, what I claim as new and desire to secure by Letters Patent, is:—

1. In combination, an internal combustion engine of metallic structure, metallic manifolds therefor and fused quartz rotary valves supported thereby and rotating therein.

2. In combination in a rotary valve engine of metallic cylinders, a metallic inlet manifold, a fused quartz sleeve rotatably mounted therein, a rotary valve mounted within said sleeve and rotating therein, means for driving said valve in rotation, an exhaust manifold and a fused quartz rotary valve rotating therein, and means for rotating said exhaust valve.

3. In combination in a rotary valve engine of metallic cylinders, a metallic inlet manifold, a fused quartz sleeve rotatably mounted therein, a rotary valve mounted within said sleeve and rotating therein, means for driving said valve in rotation, an exhaust manifold and a fused quartz rotary valve rotating therein, and means for rotating said exhaust valve, a metallic means inserted in said fused quartz sleeve for rotating said sleeve to adjust its position relative to said manifold and said inlet fused quartz rotary valve.

In testimony whereof, I affix my signature.

THOMAS E. BURKHARDT.